No. 634,559. Patented Oct. 10, 1899.
J. E. LENHULT.
RAIL BOND.
(Application filed Dec. 28, 1898.)
(No Model.) 2 Sheets—Sheet 1.
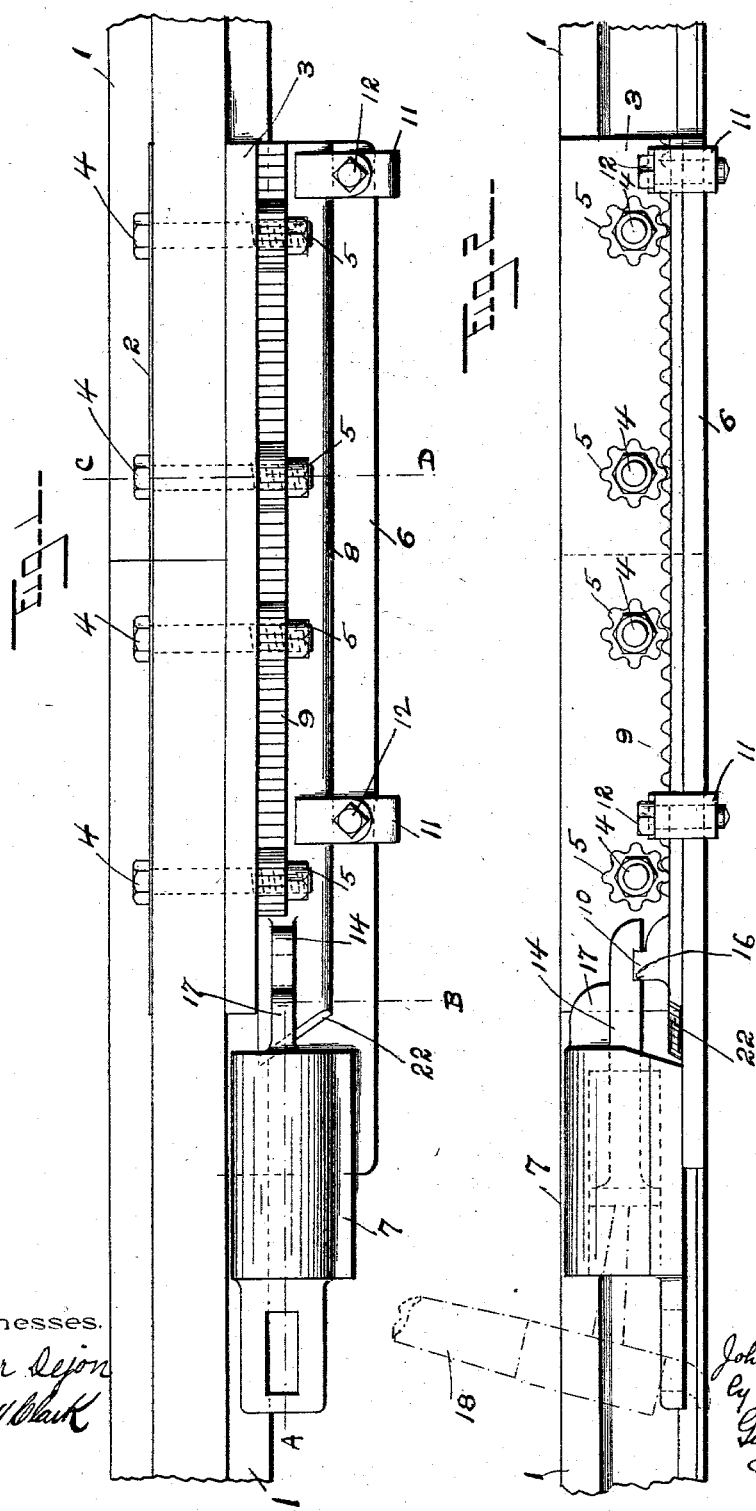
Witnesses.
J. Peter Dejon
Edwin M Clark
Inventor.
John E. Lenhult
by
George E. Hall
Attorney.

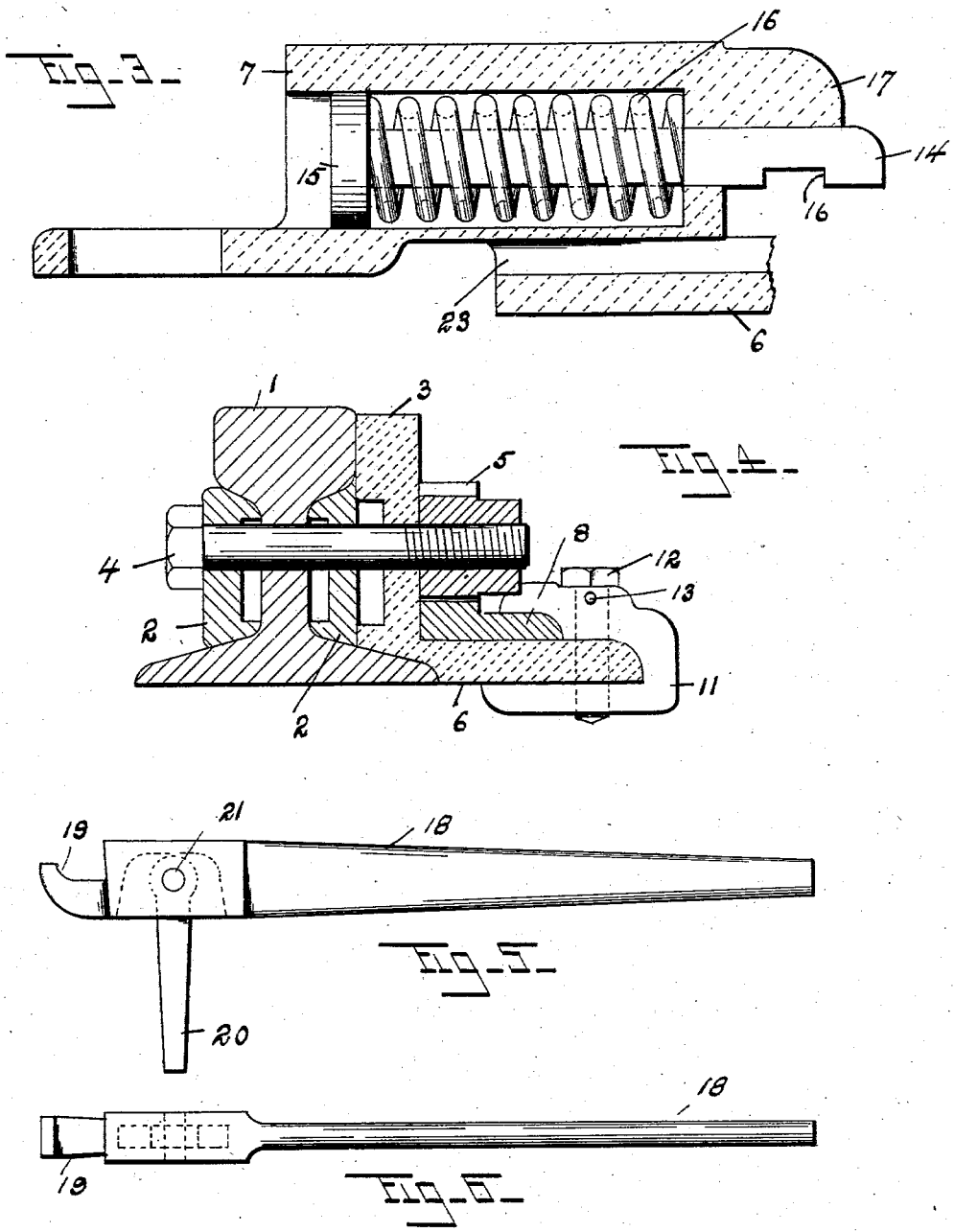

UNITED STATES PATENT OFFICE.

JOHN E. LENHULT, OF LEETE'S ISLAND, CONNECTICUT.

RAIL-BOND.

SPECIFICATION forming part of Letters Patent No. 634,559, dated October 10, 1899.

Application filed December 28, 1898. Serial No. 700,486. (No model.)

*To all whom it may concern:*

Be it known that I, JOHN E. LENHULT, a citizen of the United States, residing at Leete's Island, county of New Haven, and State of Connecticut, have invented certain new and useful Improvements in Rail-Bonds, of which the following is a specification, reference being had therein to the accompanying drawings.

My invention relates to rail-bonds, more specifically to devices for retaining the nuts of a rail-bond in a tightened position, and has for its object simplicity of structure and certainty of operation.

To this end my invention consists of the rail-bond having certain details of construction and combinations of parts, as will be hereinafter fully described, and more particularly pointed out in the claims.

Referring to the drawings, in which like numerals designate like parts in the several views, Figure 1 is a plan view. Fig. 2 is a front elevation. Fig. 3 is a section of the spring-cylinder upon line A B of Fig. 1. Fig. 4 is a cross-section upon line C D of Fig. 1, and Figs. 5 and 6 are views of the lever.

The abutting ends of railway-rails are commonly joined by an overlapping plate upon either side thereof and a plurality of bolts which pass through the said plates and rails, the whole mass being secured together by means of threaded nuts upon the ends of the bolts. The movement of a train of cars over the rails causes these nuts to become loosened, and if not again tightened they drop off, separating the rail ends and frequently causing serious accidents. This liability is greater upon a trestle or bridge than upon the level earth, due principally to the fact that the earth below the rail-ties yields slightly to the weight of the train, while the rigidity of a trestle or bridge has a tendency to concentrate the motion in the ends of the rails, and thereby jar the nuts loose.

My invention is designed to hold all of the nuts of a rail-joint in their tightened position by a constant tension which will always tend to tighten the nuts and absolutely prevent the loosening thereof, thus insuring safety and through it economy.

In the drawings the numerals 1 1 designate two car-rails, the ends of which abut against each other, as is common in railroad construction; 2 2, the tie-plates; 3, the reinforce tie-plate; 4, the tie-bolts, and 5 the tie-bolt nuts, having gear-teeth cut around a portion thereof. Reinforce-plate 3 is formed with a laterally-projecting base 6, upon one end of which is the cylinder 7, having the outer end open and a rectangular hole through the otherwise solid inner end.

The numeral 8 designates the slide, having the upwardly-projecting lug 10 and the rack 9 upon its upper side, the teeth in the rack corresponding with those of the nut 5. Lateral movement of the slide is prevented by the clips 11 11, which are fastened to the edge of the base 6 by the studs 12 12 and pins 13.

The tension-bar 14 is provided with an enlarged head 15, that fits loosely within the cylinder 7, and the lower edge near its opposite end is cut away to form the recess 16, which is substantially the same width as the lug 10. Between the head 15 and the end of the cylinder 7 is the coil-spring 16, and projecting outward from the front of the said cylinder is the arm 17, which forms a backing for the tension-bar 14. The lever 18 has a hook 19 at its lower end and a loose arm 20, mounted upon the pintle 21.

The operation of the device is as follows: The tie-plates 2 2 and 3 are placed in position, the bolts 4 are inserted, and the nuts 5 screwed thereon until fully tightened. The tension-bar 14 is then forced as far outward as possible against the tension of the coil-spring 16 by means of the lever 18, as illustrated by the broken lines in Fig. 2. The slide 8 is then placed in position, the teeth upon the nuts 5 meshing into the teeth upon the rack 9 and the lug 10 fitting snugly within the recess 16 in the tension-bar. The clips 11 11 are now fastened to the base of the plate 3, and finally the lever 18 is removed. The expansion of the spring 16 against the head 15 draws the slide toward the cylinder and holds all of the nuts 5 in their tightened position, and, further, the movement of the slide is in the direction toward which the nuts are tightened, so that before they can be loosened the tension of the spring 16 must be overcome.

The front end of the slide 8 is cut off at an angle and beveled at 22, and a recess is formed under the cylinder at 23 to prevent the clogging of the parts by ice or snow.

There are many minor changes and alterations that can be made within my invention, and I would therefore have it understood that I do not limit myself to the exact construction herein shown and described, but claim all that falls fairly within the spirit and scope of my invention.

What I claim as new, and desire to secure by Letters Patent, is—

1. In a device of the character described, the combination with a tie-plate having a laterally-projecting base with a spring-cylinder thereupon, of a plurality of tie-bolts and nuts threaded thereon, a slide member having operative connection with the said nuts and resting upon the said base, and a spring-actuated connection-bar uniting the said slide and cylinder, substantially as described.

2. In a device of the character described, the combination with a tie-plate having a laterally-projecting base, a spring-cylinder upon said base, a plurality of tie-bolts and nuts threaded thereon, a slide member resting upon said base and having an operative connection with each of the said nuts and actuated in one direction by a spring within the said cylinder, and means for actuating the said slide in the opposite direction, substantially as described.

3. In a device of the character described, the combination of a plurality of tie-bolts and nuts threaded thereon, a slide member having operative connection with each of the said nuts, a spring-cylinder, and a connection-bar between the said cylinder and said slide member, and a spring within said cylinder which is adapted to draw the said slide in one direction, substantially as described.

4. In a device of the character described, the combination of a plurality of tie-bolts, nuts threaded thereon, the said nuts having teeth cut upon the outside thereof, a slide member having teeth cut in a portion thereof which mesh into the teeth of said nuts, a spring-cylinder, a connection-bar uniting the said slide with said cylinder, and a spring, the tension of which is exerted to draw the said slide in one direction, substantially as described.

In testimony whereof I affix my signature in presence of two witnesses.

JOHN E. LENHULT.

Witnesses:
  GEORGE E. HALL,
  J. PETER DEJOU.